United States Patent

Stielau

[11] 4,226,725
[45] Oct. 7, 1980

[54] IMPROVEMENTS IN OR RELATING TO VACUUM BELT FILTERS

[75] Inventor: Theodor M. Stielau, Johannesburg, South Africa

[73] Assignee: Delkor Technik (Proprietary) Limited, South Africa

[21] Appl. No.: 58,097

[22] Filed: Jul. 16, 1979

Related U.S. Application Data

[63] Continuation-in-part of Ser. No. 933,474, Aug. 14, 1978, Pat. No. 4,186,092.

[51] Int. Cl.³ ............................................. B01D 33/04
[52] U.S. Cl. ...................... 210/400; 210/411
[58] Field of Search .................. 210/77, 79, 82, 105, 210/107, 108, 333 R, 333 A, 386, 392, 393, 400–402, 407–412

[56] References Cited

U.S. PATENT DOCUMENTS

| | | | |
|---|---|---|---|
| 2,567,266 | 9/1951 | Young | 210/392 X |
| 3,677,411 | 7/1972 | Ishigaki | 210/401 X |
| 3,939,077 | 2/1976 | Seibert | 210/401 |
| 4,186,092 | 1/1980 | Stielau | 210/77 |

Primary Examiner—Charles N. Hart
Assistant Examiner—Richard W. Burks

[57] ABSTRACT

A horizontal vacuum belt filter having an endless filter cloth on which a residue filter cake is, in use, formed; a filter head roller; a rotatable discharge roller located some distance forward of the head roller, a portion of the filter cloth passing over a segment of the cylindrical surface of the discharge roller and being in engagement therewith; a plurality of longitudinally directed and circumferentially spaced apart passages being provided in the discharge roller which are each in communication with a different segment of the cylindrical surface of the discharge roller via suitable bores; a first valve for directing a discharge liquid to those passages which are in communication, at any particular time, with that segment of the cylindrical surface of the discharge roller engaged by the filter cloth; and a plurality of second valves for permitting flow of discharge liquid only from those passages that are in communication with the said segment through the bores associated with those passages to the said segment.

The second valves may be in each of the bores close to the outlet end thereof and may be pressure operated with the discharge liquid being supplied under pressure to those passages in communication with the said segment.

10 Claims, 6 Drawing Figures

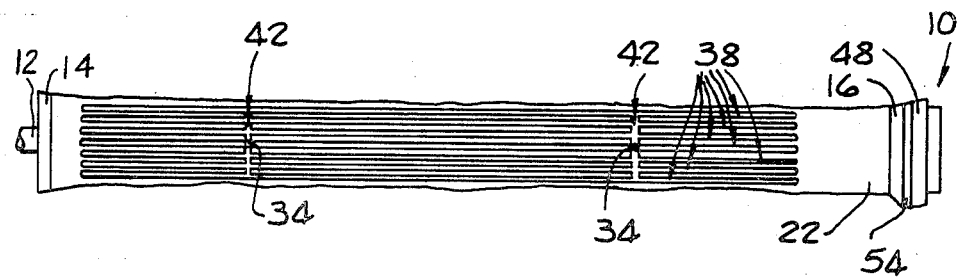
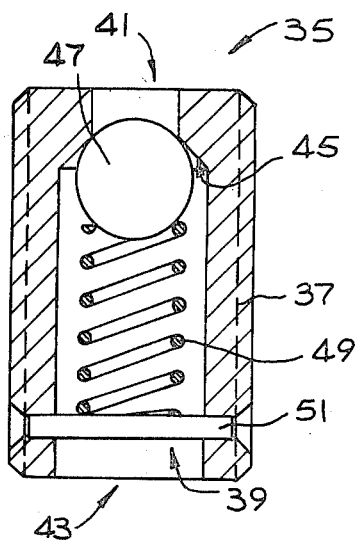
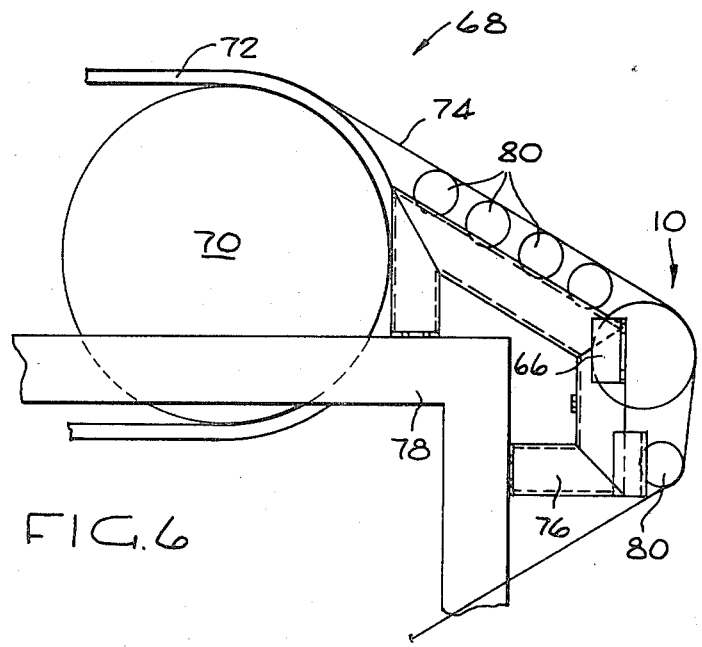

IMPROVEMENTS IN OR RELATING TO VACUUM BELT FILTERS

RELATED APPLICATION

This application is a continuation-in-part of my co-pending application Ser. No. 933,474 filed on Aug. 14, 1978 and now U.S. Pat. No. 4,186,092, Jan. 29, 1980.

SUMMARY OF THE INVENTION

According to the invention there is provided a horizontal vacuum belt filter which includes an endless filter cloth on which a residue filter cake is, in use, formed;

a filter head roller;

a rotatable discharge roller located some distance forward of the head roller, a portion of the filter cloth passing over a segment of the cylindrical surface of the discharge roller and being in engagement therewith;

a plurality of longitudinally directed and circumferentially spaced apart passages in the discharge roller which are each in communication with a different segment of the cylindrical surface of the discharge roller via suitable bores;

a first valve means for directing a discharge liquid to those passages which are in communication, at any particular time, with that segment of the cylindrical surface of the discharge roller engaged by the filter cloth; and a plurality of second valve means for permitting flow of discharge liquid only from those passages that are in communication with the said segment through the bores associated with those passages to the said segment.

One of the second valve means may be provided in each of the bores close to the outlet end thereof. The FILTER may include a discharge liquid supply means for supplying pressurised discharge liquid to those passages in communication with the said segment via the first valve means. Accordingly, the second valve means may be pressure operated valves adapted to open and allow passage of discharge liquid when the pressure of discharge liquid in the bore associated with the valve is greater than a predetermined value.

The passages may be open at one end and the first valve means may comprise a stationary end valve with which the passages are alternately aligned upon rotation of the discharge roller.

The discharge roller may have a plurality of sets of longitudinally extending distribution channels in its cylindrical surface, the sets being circumferentially distributed with the channels of each set being in fluid communication with one another and with appropriate different bores. Conveniently, the discharge liquid may be water.

The filter may further include a drive means for rotatably driving the roller and the filter cloth may be tensioned thereby to hold it in engagement with the discharge roller. In order to support the filter cloth in the region between the discharge and head rollers, a series of supporting rollers may be provided intermediate the discharge and head rollers.

BRIEF DESCRIPTION OF THE DRAWINGS

The invention is now described by way of an example, with reference to the accompanying drawings, in which:

FIG. 1 being a view along line I—I;

FIG. 1 again being a view along line I—I in FIG. 3;

FIG. 4 is a side view of the roller shown in FIGS. 1 to 3, which shows a segment of the cylindrical surface of the roller;

FIG. 5 shows in more detail a sectional view of a pressure valve that forms part of the roller; and FIG. 6 shows schematically a head portion of a horizontal vacuum belt filter, indicating the position of the roller of FIGS. 1 to 4.

DESCRIPTION OF A PREFERRED EXAMPLE

Figure 1:
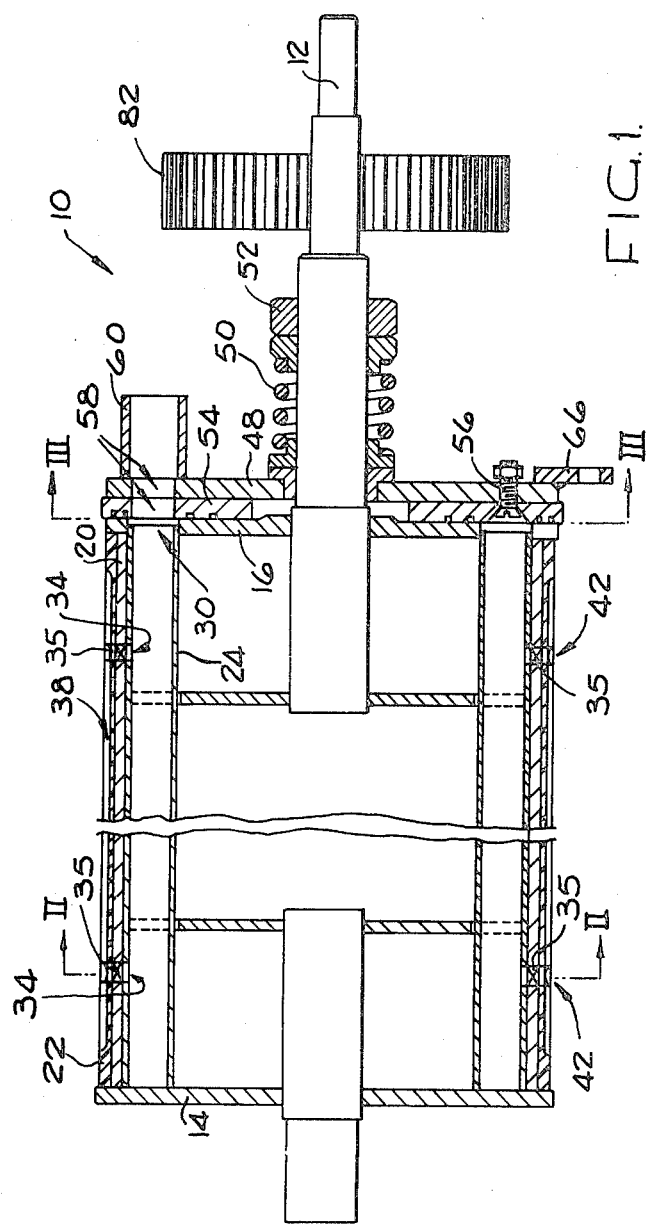
FIG. 1 shows an axial sectional view of a residue cake discharge roller in accordance with the invention.
Figure 2:
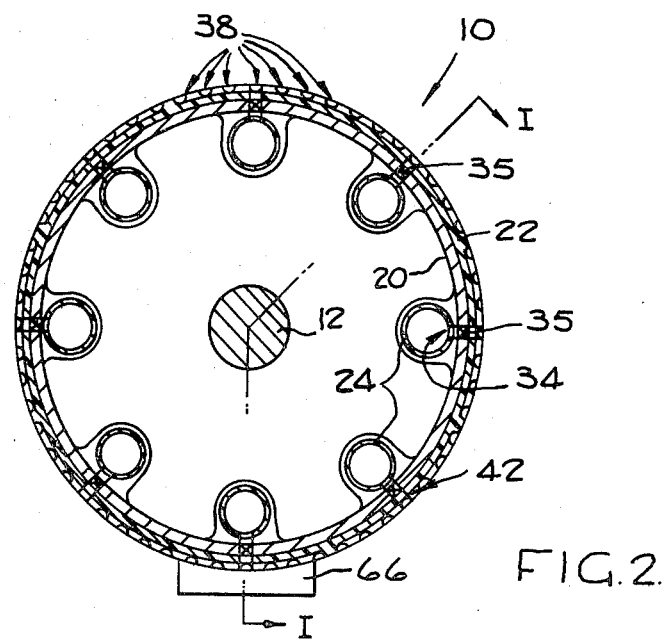
FIG. 2 shows a transverse sectional view of the roller of FIG. 1 along line II—II in FIG. 1.

Referring now to FIGS. 1 to 4, a cake discharge roller is indicated therein, referred to generally by reference numeral 10. The roller 10 has a circular cylindrical transverse sectional profile, and is mountable to be rotatable by means of a shaft 12. The roller 10 is driven from a constant torque drive by means of a gear wheel 82 which is fast with the shaft 12. Fast with the shaft 12 and rotatable therewith are two end walls 14 and 16 to which is secured a cylindrical member 20. Secured to the outer surface of the cylindrical member 20 is a rubber lining 22. Within the roller 10, there are eight longitudinally extending tubes 24 which are secured to the inner surface of the cylindrical member 20. The tubes 24 are circumferentially spaced-apart every 45 degrees. The tubes 24 are in communication with the outer surface of the roller 10 by means of bores 34. Within these bores 34 are pressure operated valves 35 which are shown in more detail in FIG. 5. As shown in FIG. 5, each valve 35 comprises a housing 37 having a passage 39 therethrough. The passage 39 has an inlet end 41 and an outlet end 43. The inlet end 41 of the passage 39 is narrower than its outlet end 43 a tapered seat 45 being provided close to the inlet end 41. A ball 47 is urged against the seat 45 by means of a spring 49. The spring 49 is kept in position in the housing 37 be means of a pin 51.

Returning now to FIGS. 1 to 4 it will be noted that apertures 30 are provided in the end wall 16 in register with the tubes 24.

The outer cylindrical surface of the roller 10 is divided into eight segments, a segment for each tube 24. Each segment is provided with a set of longitudinally extending channels in the outer surface of the rubber lining 22. Each set comprises seven longitudinally extending channels 38 that are connected by means of arcuate channels 42. As indicated in FIG. 4, the bores 34 open in the arcuate channels 42. Thus, the longitudinal channels 38 are in communication with the tubes 24.

Figure 3:
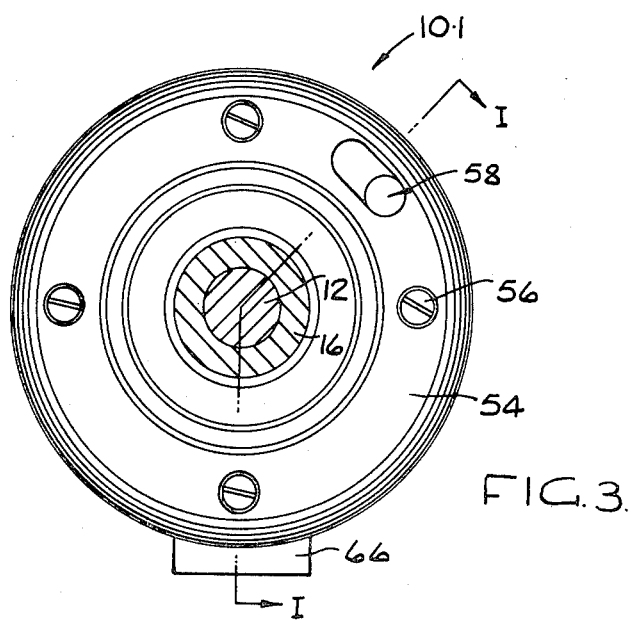
FIG. 3 shows a further transverse sectional view of the roller of FIG. 1 along line III—III therein.

The roller 10 further has a stationary end plate 48 which is biassed against the end wall 16 by means of a spring 50 which engages a collar 52 on the shaft 12. An annular sealing member 54 is provided between the end plate 48 and the end wall 16. This sealing member 54 is of a suitable synthetic plastics material having a low coefficient of friction. Further, the sealing member 54 is secured to the end plate 48 by means of bolts 56, as indicated in FIGS. 1 and 3. The end plate 48 and the sealing member 54 have corresponding apertures 58 situated at a suitable radial position such that the apertures 30 in the end wall 16 may be brought into register therewith upon rotation of the end wall 16. A connecting pipe 60 is provided fast with the end plate 48 about the aperture 58 therein. Finally, a retaining member 66 is provided, fast with the end plate 48.

Referring now to FIG. 6, the head portion of a horizontal vacuum belt filter is shown generally by reference numeral 68. Shown therein is a head roller 70 about which passes a support belt 72 of the filter, upon which is supported a filter cloth 74. The discharge roller 10 is rotatably supported a suitable distance away from the head roller 70. An auxiliary mounting frame 76 is provided which is secured to a framework structure 78 of the filter. The discharge roller 10 is freely rotatably secured to this mounting frame 76. A number of intermediate support rollers 80 are provided for supporting the cloth 74. The roller is such that the connecting pipe 60 is in communication with that portion of the cylindrical surface of the roller 10 engaged by the cloth 74, via the apertures 58, and the appropriate aperture 30, tube 24 and bore 34.

In use, the connecting pipe 60 is connected to a suitable supply (not shown) of water under pressure. The filter cloth 74 is tensioned with the result that as the roller 10 is rotatably driven the filter cloth 74 is kept in contact with the cylindrical surface of the roller 10. The channels 38 of the segment of the cylindrical surface that is engaged by the filter cloth 74 is supplied with water, as described above, via the connecting pipe 60, the appropriate tube 24 and its bores 34. As water in the tube 24 that is at any instant of time in communication with the pipe 60 is under pressure, the balls 47 of the valves 35 in these bores 34 are forced away from their seats 45 and water flows out through the bores 34 into the arcuate channels 42 and the longitudinal channels 38. As a result, water is forced through the filter cloth in a reverse direction, thereby dislodging any filter cake present on that portion of the cloth 74. As the cloth 74 travels further, to assume a more vertical attitude, the so dislodged filter cake slides off the cloth 74. It will be appreciated, that as the cloth 74 is displaced, the roller 10 also rotates and successive segments of the cylindrical surface are brought into engagement with the cloth 74, successive tubes 24 being brought into communication with the water supply. It will be further appreciated that with the tubes 24 that are not in communication with the pipe 60 water therein is no longer under pressure and the balls 47 of the valves 35 in the bores 34 associated with these tubes 24 are urged into sealing engagement with their seats 45. There is accordingly no flow of water out of the tubes 24 that are not in alignment with that portion of the filter cloth 74 that is in engagement with the roller 10. Spillage and wastage of water is accordingly minimised. Also, as no water drains out of the tube 24 it is not necessary for these tubes 24 to be filled with water via the connecting pipe 60 when they come into alignment therewith.

I claim:

1. A horizontal vacuum belt filter which includes an endless filter cloth on which a residue filter cake is, in use, formed;

a filter head roller;

a rotatable discharge roller located some distance forward of the head roller, a portion of the filter cloth passing over a segment of the cylindrical surface of the discharge roller and being in engagement therewith;

a plurality of longitudinally directed and circumferentially spaced apart passages in the discharge roller which are each in communication with a different segment of the cylindrical surface of the discharge roller via suitable bores;

a first valve means for directing a discharge liquid to those passages which are in communication, at any particular time, with that segment of the cylindrical surface of the discharge roller engaged by the filter cloth; and a plurality of second valve means for permitting flow of discharge liquid only from those passages that are in communication with the said segment through the bores associated with those passages to the said segment.

2. A vacuum belt filter as claimed in claim 1, which has one of the second valve means in each of the bores close to the outlet end thereof.

3. A vacuum belt filter as claimed in claim 2, which includes a discharge liquid supplying means for supplying pressurized discharge liquid to those passages in communication with the said segment via the first valve means.

4. A vacuum belt filter as claimed in claim 3, in which at least one of the second valve means is a pressure operated valve adapted to open and allow passage of discharge liquid when the pressure of discharge liquid in its bore is greater than a predetermined value.

5. A vacuum belt filter as claimed in claim 1, in which the passages are open at one end and the first valve means comprises a stationary end valve with which the passages are alternately aligned upon rotation of the discharge roller.

6. A vacuum belt filter as claimed in claim 1, in which the discharge roller has a plurality of sets of longitudinally extending distribution channels in its cylindrical surface, the sets being circumferentially distributed and with the channels of each set being in fluid communication with one another and with appropriate different bores.

7. A vacuum belt filter as claimed in claim 1, in which the discharge liquid is water.

8. A vacuum belt filter as claimed in claim 1, which includes a drive means for rotatably driving the roller.

9. A vacuum belt filter as claimed in claim 1, in which the filter cloth is tensioned thereby to hold the cloth in engagement with the discharge roller.

10. A vacuum belt filter as claimed in claim 1, which has a series of supporting rollers intermediate the discharge and head rollers for supporting the filter cloth.

* * * * *